(12) United States Patent
Ohnishi

(10) Patent No.: US 9,674,405 B2
(45) Date of Patent: Jun. 6, 2017

(54) OUTPUT CONTROL SYSTEM, OUTPUT CONTROL METHOD, AND RECORDING MEDIUM

(71) Applicant: Kazuki Ohnishi, Tokyo (JP)

(72) Inventor: Kazuki Ohnishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/045,801

(22) Filed: Feb. 17, 2016

(65) Prior Publication Data

US 2016/0241746 A1    Aug. 18, 2016

(30) Foreign Application Priority Data

Feb. 18, 2015 (JP) ................. 2015-029366

(51) Int. Cl.
*H04N 1/60* (2006.01)
*G06F 3/12* (2006.01)
*G06K 15/00* (2006.01)

(52) U.S. Cl.
CPC ......... *H04N 1/6058* (2013.01); *G06F 3/1208* (2013.01); *G06F 3/1255* (2013.01); *G06F 3/1285* (2013.01); *H04N 1/6019* (2013.01); *H04N 2201/0094* (2013.01)

(58) Field of Classification Search
None
See application file for complete search history.

(56) References Cited

U.S. PATENT DOCUMENTS

2005/0180793 A1*  8/2005  Nishiguchi ............ G06K 15/00
                                                              400/76
2013/0163012 A1   6/2013  Miyahara

FOREIGN PATENT DOCUMENTS

JP          2013-129097         7/2013

* cited by examiner

*Primary Examiner* — Dov Popovici
(74) *Attorney, Agent, or Firm* — Cooper & Dunham LLP

(57) ABSTRACT

Example embodiments of the present invention include an apparatus, system, and a method of controlling output of a data file, which receives a request for printing a data file having a plurality of objects from an information processing apparatus operated by a user, each object being embedded with a profile set by the user, determines whether a setting of the profiles in the data file is proper to generate a determination result, and transmits, when the determination result indicates that the setting of the profiles is improper, a notification indicating that the setting of the profiles is improper, to the information processing apparatus for display to the user.

14 Claims, 14 Drawing Sheets

FIG. 14

HEADER INFORMATION

| | |
|---|---|
| Profile_size : | 560 |
| CMM_type : | XXXX |
| Profile_version : | 2.1.0.0 |
| Profile_Device_class : | mntr |
| Color_space : | RGB |
| PCS : | XYZ |
| Date_and_time : | 2000/8/11 19:51:59 |
| Magic : | acsp |
| Primary_platform : | XXXX |
| Flags : | 0 |
| Device_manufacturer : | none |
| Device_model : | 0 |
| Device_attributes : | 0 |
| Rendering_Intent : | 0 |
| Illuminat : | 0.964203, 1.000000, 0.824905 |
| Profile_creator : | XXXX |
| Profile_ID : | 0-0-0-0 |

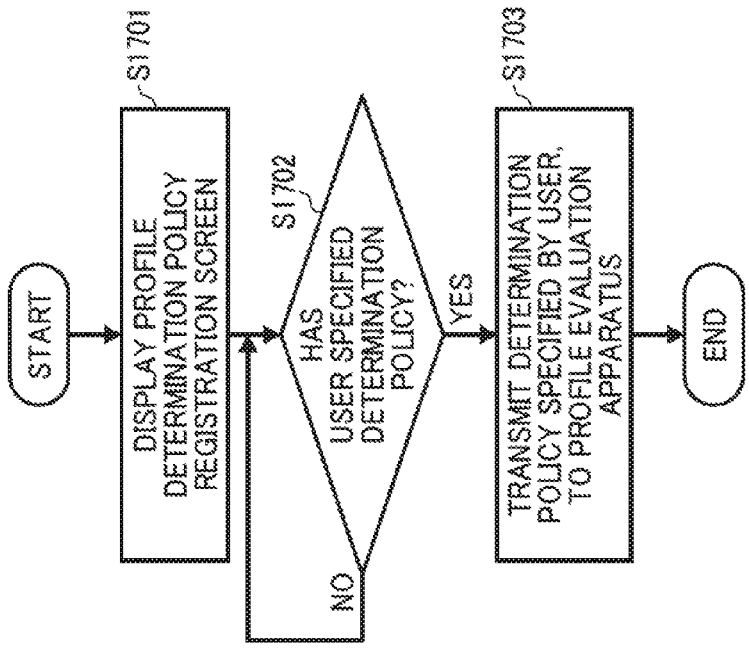
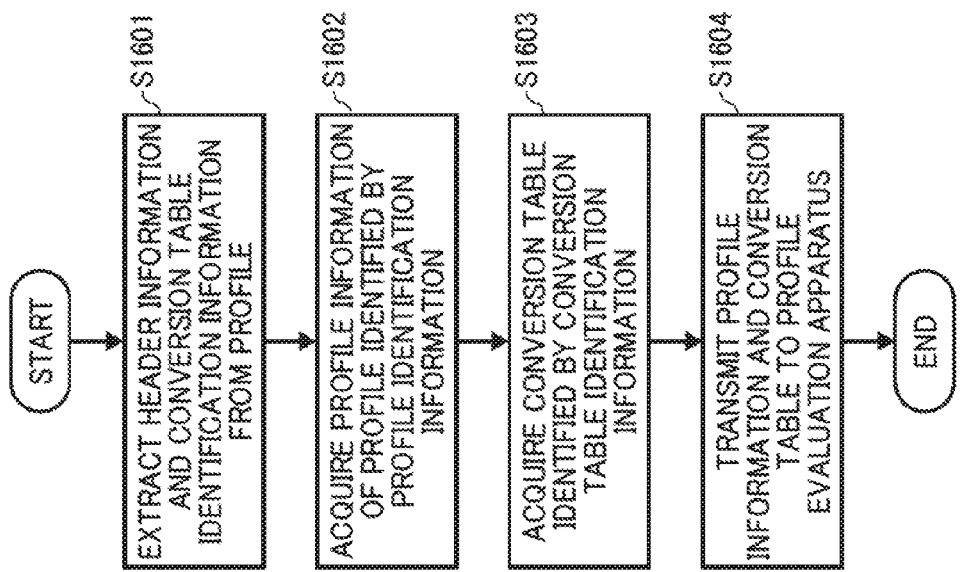

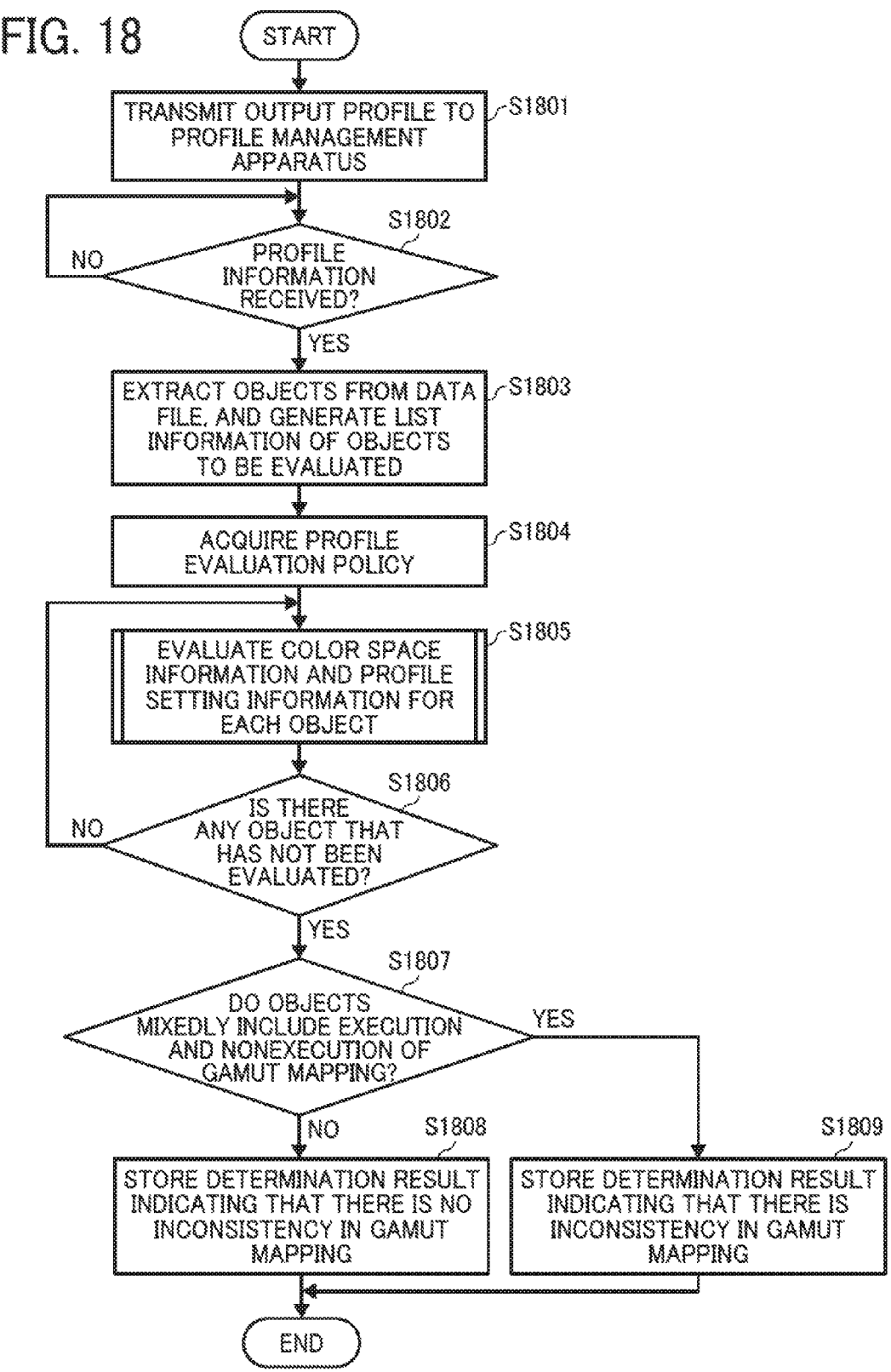

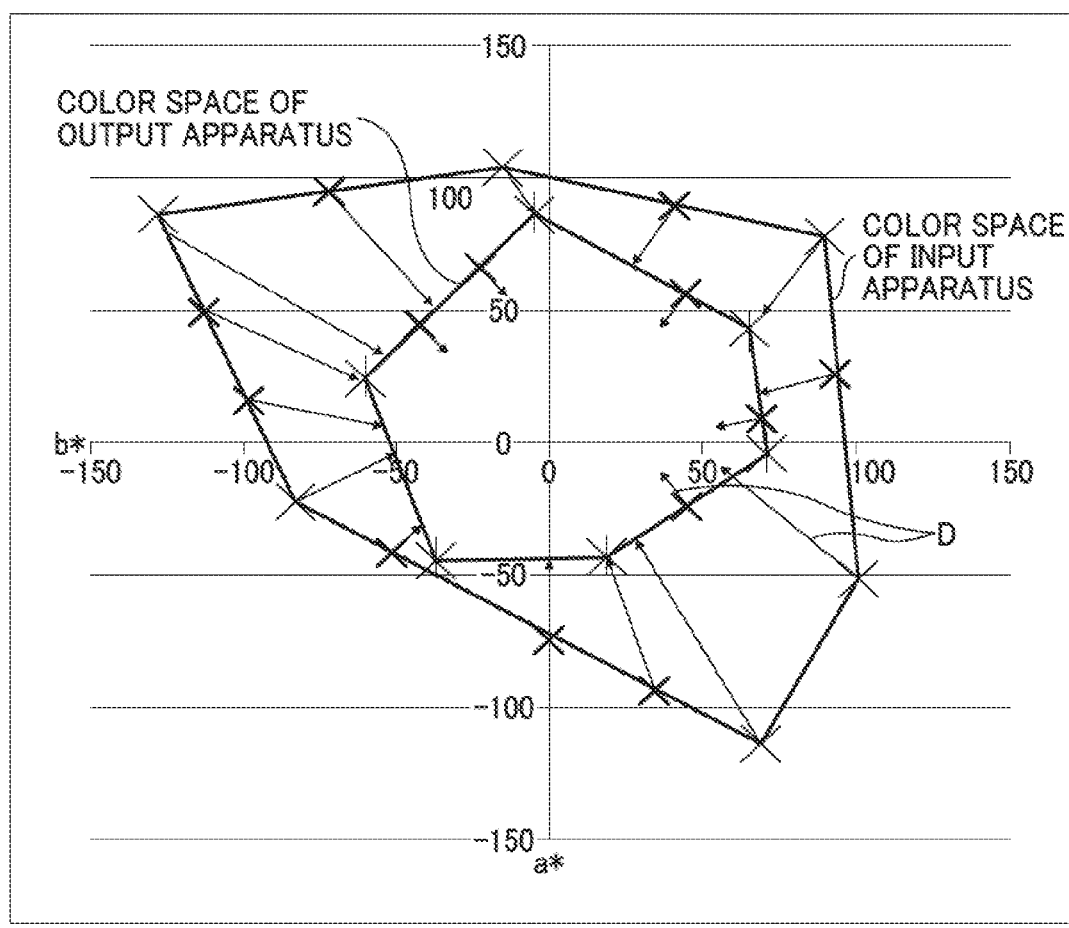

OUTPUT CONTROL SYSTEM, OUTPUT CONTROL METHOD, AND RECORDING MEDIUM

CROSS-REFERENCE TO RELATED APPLICATIONS

This patent application is based on and claims priority pursuant to 35 U.S.C. §119(a) to Japanese Patent Application No. 2015-029366, filed on Feb. 18, 2015, in the Japan Patent Office, the entire disclosure of which is hereby incorporated by reference herein.

BACKGROUND

Technical Field

The present invention relates to an output control system, an output control method, and a recording medium storing output control program.

Description of the Related Art

In color management, color matching is performed among a plurality of image processing apparatuses via a device-independent color space, using an International Color Consortium (ICC) profile (e.g., input profile, output profile, etc.) indicating the correspondence between a device-dependent color space (e.g., RGB, CMYK, etc.) and a device-independent color space (e.g., CIELAB, etc.).

Representable color spaces are often different between an input apparatus (scanner, digital camera, etc.) and an output apparatus (printer, etc.). To print image data having a color that are not reproducible by the output apparatus, gamut mapping is performed in which the color in the image data is converted into a color reproducible by the output apparatus. For example, a virtual gamut is previously set based on profiles of a plurality of devices. The image processing apparatus converts profile connection space (PCS) values for input data, using a color reference profile defined on the virtual gamut. This suppresses the visual difference in output color between a plurality of output apparatuses.

SUMMARY

Example embodiments of the present invention include an apparatus, system, and method of controlling output of a data file, which receives a print request for printing a data file having a plurality of objects from an information processing apparatus operated by a user, each object being embedded with a profile set by the user, determines whether a setting of the profiles in the data file is proper to generate a determination result, and transmits, when the determination result indicates that the setting of the profiles is improper, a notification indicating that the setting of the profiles is improper, to the information processing apparatus for display to the user.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14 is a diagram illustrating an example of header information of a profile;

FIG. 16 is a flowchart illustrating operation of providing profile information, performed by the profile management apparatus, according to an embodiment of the present invention;

FIG. 17 is a flowchart illustrating operation of setting a profile determination policy, performed by the user PC, according to an embodiment of the present invention;

FIG. 18 is a flowchart illustrating operation of evaluating profile file, performed by the profile evaluation apparatus, according to an embodiment of the present invention; and FIG. 19 is a diagram illustrating a difference in color space between an input apparatus and an output apparatus that is obtained by gamut mapping.

Figure 1:
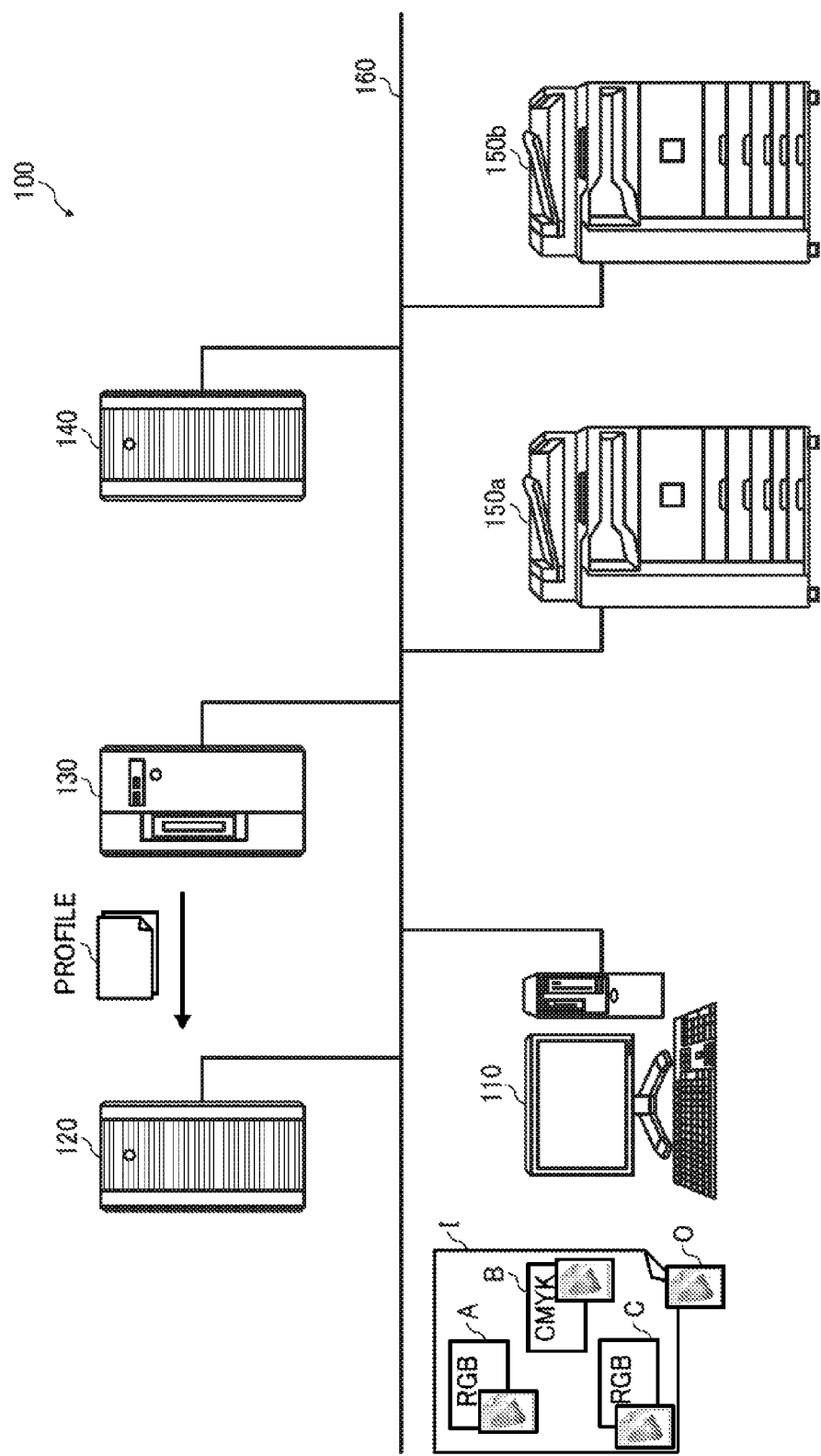
FIG. 1 is a diagram illustrating a print control system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 is a diagram illustrating a print control system 100 according to an embodiment of the present invention. The print control system 100 includes a user PC 110, a profile evaluation apparatus 120, a profile management apparatus 130, a device control apparatus 140, and a plurality of printers 150a and 150b, which are connected via a network 160. The network 160 may be of any desired type of network, such as the Internet and a local area network (LAN).

The user PC 110 is one example of an information processing apparatus that requests printing of a data file ("I" in FIG. 1, for example) in response to a user instruction.

In this example, the data file has a plurality of objects such as an image, line, or text. For example, the image data may be a PDF data file having a plurality of image objects. Each object may be embedded with an input profile in which the color reproduction characteristics of an input apparatus (scanner, digital camera, etc.) that inputs the image object are described, such as color space information. In addition, the input profile for each object may be set with gamut mapping information indicating whether to apply gamut mapping.

In setting gamut mapping, the user PC 110 converts the color of an object included in the data file to be printed to a color of the object to be reproduced by an output destination printer using a color reference profile, and displays the object with the converted color on a display of the user PC 110. Through a screen being displayed, the user can check the object reproduced in the color that can be printed by the output destination printer, and determines a setting of input profile such as whether gamut mapping is to be applied for each object.

Accordingly, the input profile such as color space and a setting of the gamut mapping may differ among a plurality of objects in the data file.

The data file to be printed may further include an output profile in which the color reproduction characteristics of an output destination printer (in this embodiment, any printer included in the print control system 100) are described. In addition to color space information, the output profile may further indicate whether to apply gamut mapping to entire data file to be printed for output through the output destination printer. Accordingly, the input profile of each object and the output profile of the entire data file may differ.

If the input profiles differ among a plurality of object in the data file, or any one of the input profile for the object differs from the output profile for the entire data file, gamut mapping may not be appropriately performed. For example, referring to FIG. 19, the colors of the data file expressed in the RGB color space (input profile) are converted to the colors expressed in the CMYK color space (output profile). If gamut mapping is to be applied to a specific image object, the color of such image object is further converted, compared to the other part of the data file. This results in difference in color as indicated by "D" in FIG. 19, such that color reproducibility of the entire image may be degraded. In view of this, the profile evaluation apparatus 120 is provided to evaluate setting of the data file to be printed.

In response to the user instruction for printing the data file, the user PC 110 transmits the data file to be printed having a plurality of objects, to the profile evaluation apparatus 120 together with a print request. As described above, each object in the data file is embedded with an input profile.

The profile evaluation apparatus 120, which is implemented by an information processing apparatus, evaluates the profile provided by the user PC 110 to obtain an evaluation result indicating whether the setting of the profile is proper, and controlling print processing according to the obtained evaluation result. When the setting of the profile is proper, the profile evaluation apparatus 120 causes the device control apparatus 140 to execute print processing. On the other hand, when the setting of the profile is improper, the profile evaluation apparatus 120 causes the user PC 110 to display an error notification screen.

The profile management apparatus 130, which is implemented by an information processing apparatus, stores, for each profile (input profile, output profile), profile information regarding the profile. For example, a conversion table may be stored in association with an output destination apparatus for applying gamut mapping.

In one example, the profile management apparatus 130 provides the profile evaluation apparatus 120 with a conversion table to be used for rendering the data file to be printed, according to a request from the profile evaluation apparatus 120.

The device control apparatus 140, which is implemented by an information processing apparatus, controls one or more printers in the print control system 100. In this embodiment, the printers 150a and 150b are apparatuses for printing a data file to be printed, under control of the device control apparatus 140.

In the embodiment illustrated in FIG. 1, the profile evaluation apparatus 120, the profile management apparatus 130, and the device control apparatus 140 are illustrated as individual apparatuses. Alternatively, in another embodiment, these apparatuses may be implemented as a single apparatus. In another embodiment, the functions of the profile evaluation apparatus 120, the profile management apparatus 130, and the device control apparatus 140 may be performed by the user PC 110 or the printer. In another embodiment, the functions of the profile evaluation apparatus 120, the profile management apparatus 130, and the device control apparatus 140 may be distributed over more than one apparatus (not limited to three) in various ways, for example, over the network.

Figure 2:
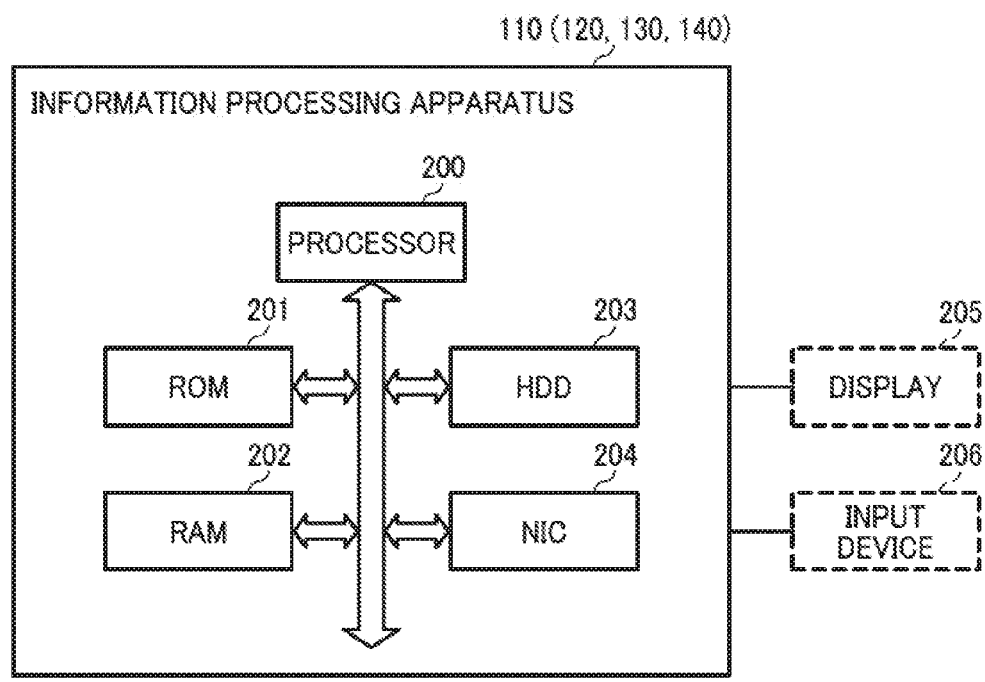
FIG. 2 is a diagram illustrating a hardware configuration of an information processing apparatus in the print control system of FIG. 1, according to an embodiment of the present invention.

FIG. 2 is a diagram illustrating a hardware configuration of an information processing apparatus according to an embodiment of the present invention. For simplicity, the example case for the user PC 110, which processes various types of image data, is described here. The user PC 110 includes a processor 200, a read-only memory (ROM) 201, a random access memory (RAM) 202, a hard disc drive (HDD) 203, and a network interface card (NIC) 204. These devices are connected to each other via a bus so that communication can be performed therebetween. Referring back to FIG. 1, the user PC 110 further includes a display 205 such as a liquid crystal display (LCD), and an input device 206 such as a keyboard and a mouse. In another embodiment, any one of the display 205 and the input device 206 may be incorporated in the information processing apparatus. In case the information processing apparatus of FIG. 2 operates as the profile evaluation apparatus 120, profile management apparatus 130, and device control apparatus 140, the display 205 and the input device 206 are not provided. In alternative to the information processing apparatus, the user may operate any other device, such as personal digital assistant (PDA) device like a smart phone, as the user PC 110.

The processor 200 is an arithmetic device for executing a program for controlling an operation of the user PC 110, such as a central processing unit (CPU). The ROM 201 is a nonvolatile memory capable of storing data such as a boot program. The RAM 202 is a volatile memory that works as a work memory for the program to be executed by the user PC 110. The HDD 203 is a nonvolatile memory capable of storing data such as the control program, which may be written in any desired programming language. The HDD 203 may store a data file to be printed.

Under control of an operating system (OS) of the user PC 110, the processor 200 loads the control program from the HDD 203 onto the RAM 202 to execute the program to achieve various functions to be described later. The NIC 204 controls data communication between the user PC 110 and other information processing apparatuses of the print control system 100.

Figure 3:
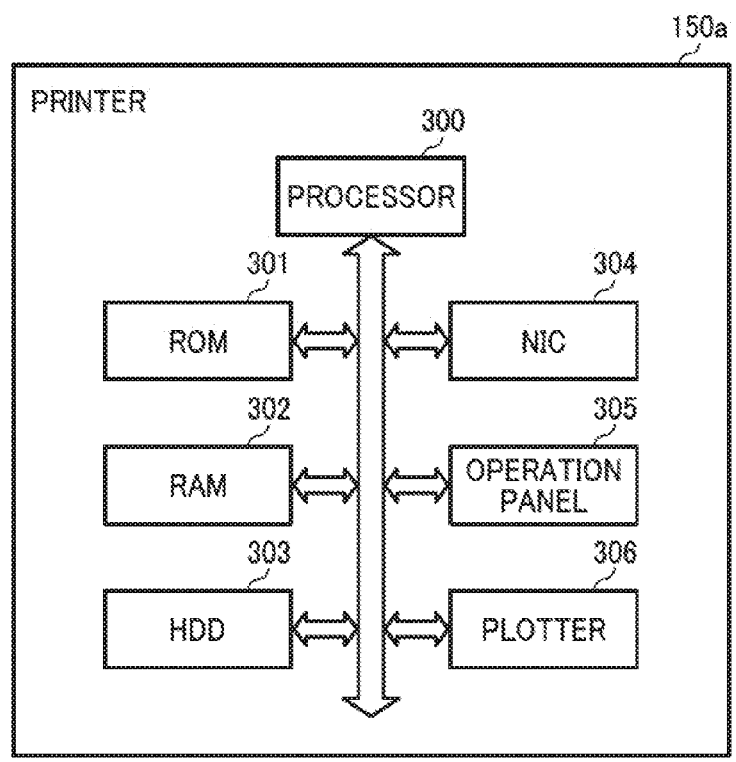
FIG. 3 is a diagram illustrating a hardware configuration of a printer in the print control system of FIG. 1, according to an embodiment of the present invention.

FIG. 3 is a diagram illustrating a hardware configuration of the printer 150a and 150b according to an embodiment of the present invention. The hardware configuration of the printer 150a will be described below with reference to FIG. 3. Note that the hardware configuration of the printer 150b is similar to that of the printer 150a, such that description thereof will be omitted. The printer 150a may be implemented as any desired image forming apparatus capable of printing such as a multifunctional peripheral.

The printer 150a includes a processor 300, a ROM 301, a RAM 302, an HDD 303, an NIC 304, an operation panel 305, and a plotter 306. These devices are connected to each other via a bus so that communication can be performed therebetween.

The processor 300 is an arithmetic device for executing a program for controlling an operation of the printer 150a. The ROM 301 is a nonvolatile memory capable of storing data such as a boot program. The RAM 302 is a volatile memory that functions as a work memory for the program to be executed by the printer 150a. The HDD 303 is a nonvolatile memory capable of storing data such as a control program as described below. The HDD 303 may store a data file to be printed.

Under control of an OS of the printer 150a, the processor 300 loads the program from the HDD 303 into the RAM 302 to execute the program to achieve various functions to be described later.

The NIC 304 controls data communication between the printer 150a and other information processing apparatuses of the print control system 100. The operation panel 305 receives an instruction from a user. The plotter 306 performs printing on a print medium.

Figure 4:
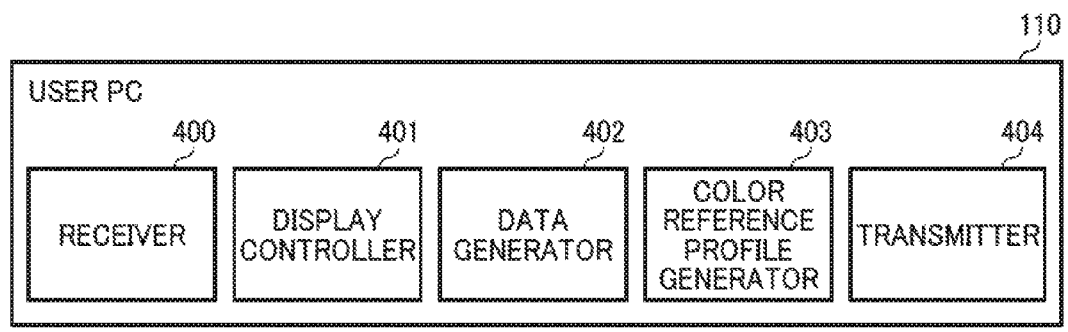
FIG. 4 is a diagram illustrating a functional configuration of a user personal computer (PC) of the print control system of FIG. 1, according to an embodiment of the present invention.

FIG. 4 is a diagram illustrating a functional configuration of the user PC 110. The functional configuration of the user PC 110 will be described below with reference to FIG. 4.

The user PC 110 includes a receiver 400, a display controller 401, a data generator 402, a color reference profile generator 403, and a transmitter 404.

The receiver 400, which corresponds to the NIC 204, receives various types of data from other apparatuses of the print control system 100. The display controller 401, which is implemented by the instructions of the processor 200, controls display of the user PC 110. More specifically, the display controller 401 displays various screens on the display 205.

The data generator 402, which is implemented by the instructions of the processor 200, generates a data file to be printed based on image data, with application installed onto the user PC 110. The image data may be any data that can be generated by the user PC 110 or any other input apparatus. The color reference profile generator 403, which is implemented by the instructions of the processor 200, generates a color reference profile based on an input profile of the input apparatus and an output profile of the output destination printer. The output destination printer may be selected by the user.

The transmitter 404, which corresponds to the NIC 204, transmits various types of data to other apparatuses of the print control system 100. The transmitter 404 transmits data such as a print request, with the data file to be printed that is embedded with the profile.

Figure 5:
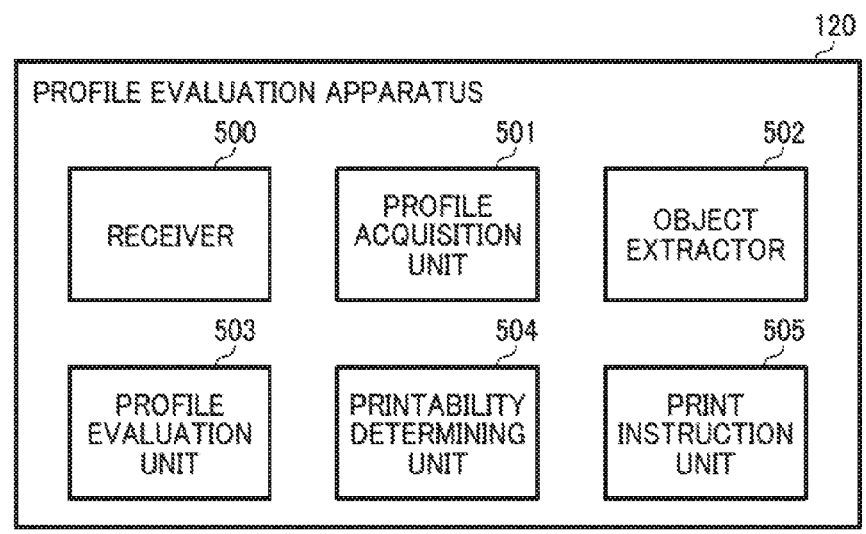
FIG. 5 is a diagram illustrating a functional configuration of a profile evaluation apparatus of the print control system of FIG. 1, according to an embodiment of the present invention.

FIG. 5 is a diagram illustrating a functional configuration of the profile evaluation apparatus 120. The functional configuration of the profile evaluation apparatus 120 will be described below with reference to FIG. 5.

The profile evaluation apparatus 120 includes a receiver 500, a profile acquisition unit 501, an object extractor 502, a profile evaluation unit 503, a printability determining unit 504, and a print instruction unit 505. In this embodiment, the receiver 500 corresponds to the NIC 204. The profile acquisition unit 501, the object extractor 502, the profile evaluation unit 503, the printability determining unit 504, and the print instruction unit 505 are implemented by the instructions of the CPU 200 generated according to the control program.

The receiver 500 receives various types of data from other apparatuses of the print control system 100. The profile acquisition unit 501 acquires profile information from the profile management apparatus 130 via the receiver 500. The object extractor 502 extracts one or more objects from the data file to be printed, which is received from the user PC 110. The profile evaluation unit 503 evaluates the profile of the data file to be printed for each object that is extracted, using the profile information obtained by the profile acquisition unit 501, to generate an evaluation result.

The printability determining unit 504 determines whether or not to print the data file to be printed, based on the evaluation result of the profile. If the printability determining unit 504 determines that the setting of the profile is improper, for example, the printability determining unit 504 determines not to print the data file, and causes the user PC 110 to display an error notification screen indicating that the setting of the profile is improper. More specifically, the printability determining unit 502 causes the NIC 204 to send an error notification to the user PC 110 for display to the user.

If the printability determining unit 504 determines to print the data file to be printed, i.e., determines that the setting of the profile is proper, for example, based on the evaluation result, the print instruction unit 505 instructs the printing of the data file.

More specifically, based on the determination result indicating that the profile is proper, the print instruction unit 505 causes the NIC 204 to send a printing instruction to the device control apparatus 140.

Figure 6:
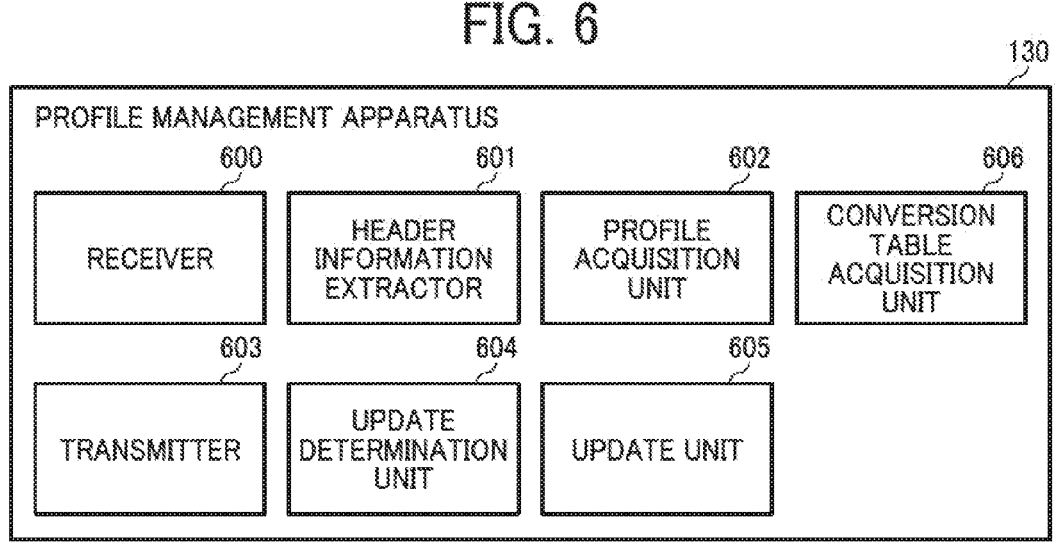
FIG. 6 is a diagram illustrating a functional configuration of a profile management apparatus of the print control system of FIG. 1, according to an embodiment of the present invention.

FIG. 6 is a diagram illustrating a functional configuration of the profile management apparatus 130. The functional configuration of the profile management apparatus 130 will be described below with reference to FIG. 6.

The profile management apparatus 130 includes a receiver 600, a header information extractor 601, a profile acquisition unit 602, a transmitter 603, an update determination unit 604, an update unit 605, and a conversion table acquisition unit 606. The profile management apparatus 130 previously stores, for each profile, profile information in the memory, which may be obtained from the printers 150a and 150b. The receiver 600, which corresponds to the NIC 204, receives various types of data from other apparatuses of the print control system 100. The header information extractor 601, which corresponds to the instructions of the processor 200, extracts header information from the profile provided by the profile evaluation apparatus 120. The profile acquisition unit 602, which corresponds to the instructions of the processor 200, acquires profile information from the memory (such as the HDD 203) of the profile management apparatus 130 that is associated with the profile received from the profile evaluation apparatus 120.

The transmitter 603, which corresponds to the NIC 204, transmits various types of data to other apparatuses of the print control system 100. The update determination unit 604, which corresponds to the instructions of the processor 200, determines whether any one of the profiles (and the profile information) in the memory is to be updated. The update unit 605, which corresponds to the instructions of the processor 200, updates the profile and profile information of the profile that are stored in the memory of the profile management apparatus 130. The conversion table acquisition unit 606, which corresponds to the instructions of the processor 200, acquires a conversion table from the memory (such as the HDD 203) of the profile management apparatus 130.

Figure 7:
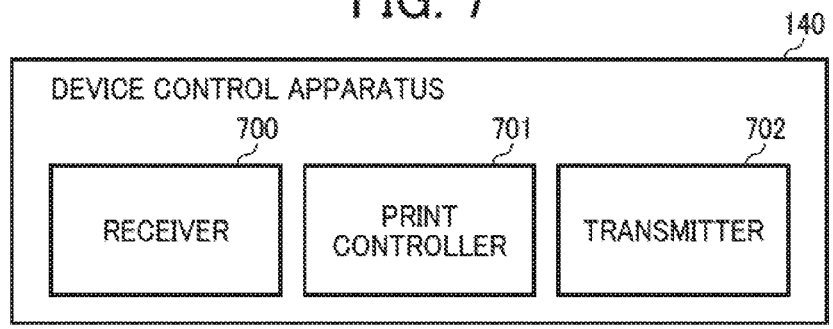
FIG. 7 is a diagram illustrating a functional configuration of a device control apparatus of the print control system of FIG. 1, according to an embodiment of the present invention.

FIG. 7 is a diagram illustrating a functional configuration of the device control apparatus 140. The functional configuration of the device control apparatus 140 will be described below with reference to FIG. 7.

The device control apparatus 140 includes a receiver 700, a print controller 701, and a transmitter 702. The receiver 700, which corresponds to the NIC 204, receives various types of data from other apparatuses of the print control system 100. The print controller 701, which corresponds to the instructions of the processor 200, controls the printers 150a and 150b. The transmitter 702, which corresponds to the NIC 204, transmits various types of data to other apparatuses of the print control system 100.

Figure 8:
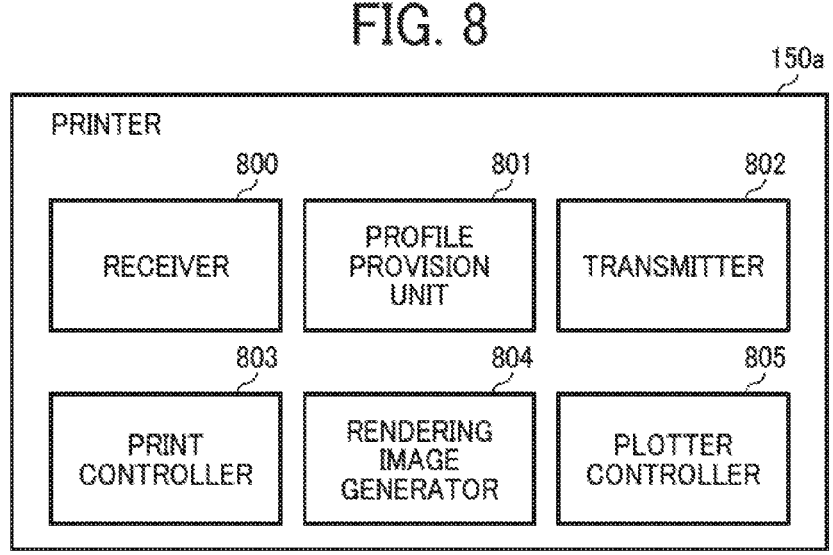
FIG. 8 is a diagram illustrating a functional configuration of a printer of the print control system of FIG. 1, according to an embodiment of the present invention.

FIG. 8 is a diagram illustrating a functional configuration of the printer 150a. The functional configuration of the printer 150a will be described below with reference to FIG. 8. Further, in this embodiment, a functional configuration of the printer 150b is similar to that of the printer 150a, such that the description thereof will be omitted.

The printer 150a includes a receiver 800, a profile provision unit 801, a transmitter 802, a print controller 803, a rendering image generator 804, and a plotter controller 805. The receiver 800 and the transmitter 802 are implemented by the NIC 304. The profile provision unit 801, the print controller 803, the rendering image generator 804, and the plotter controller 805 are implemented by the instructions of the processor 300. The receiver 800 receives various types of data from other apparatuses of the print control system 100. The profile provision unit 801 provides a profile of the printer 150a and profile information of the profile that are stored in the memory (such as the HDD 303) of the printer 150a, to the profile management apparatus 130.

The transmitter 802 transmits various types of data to other apparatuses of the print control system 100. The print controller 803 controls the rendering image generator 804 and the plotter controller 805 to execute print processing. The rendering image generator 804 generates a rendering image based on a data file to be printed, which is received from the user PC 110, for example, via the device control apparatus 140. The plotter controller 805 controls the plotter 306 to execute print processing.

Figure 9:
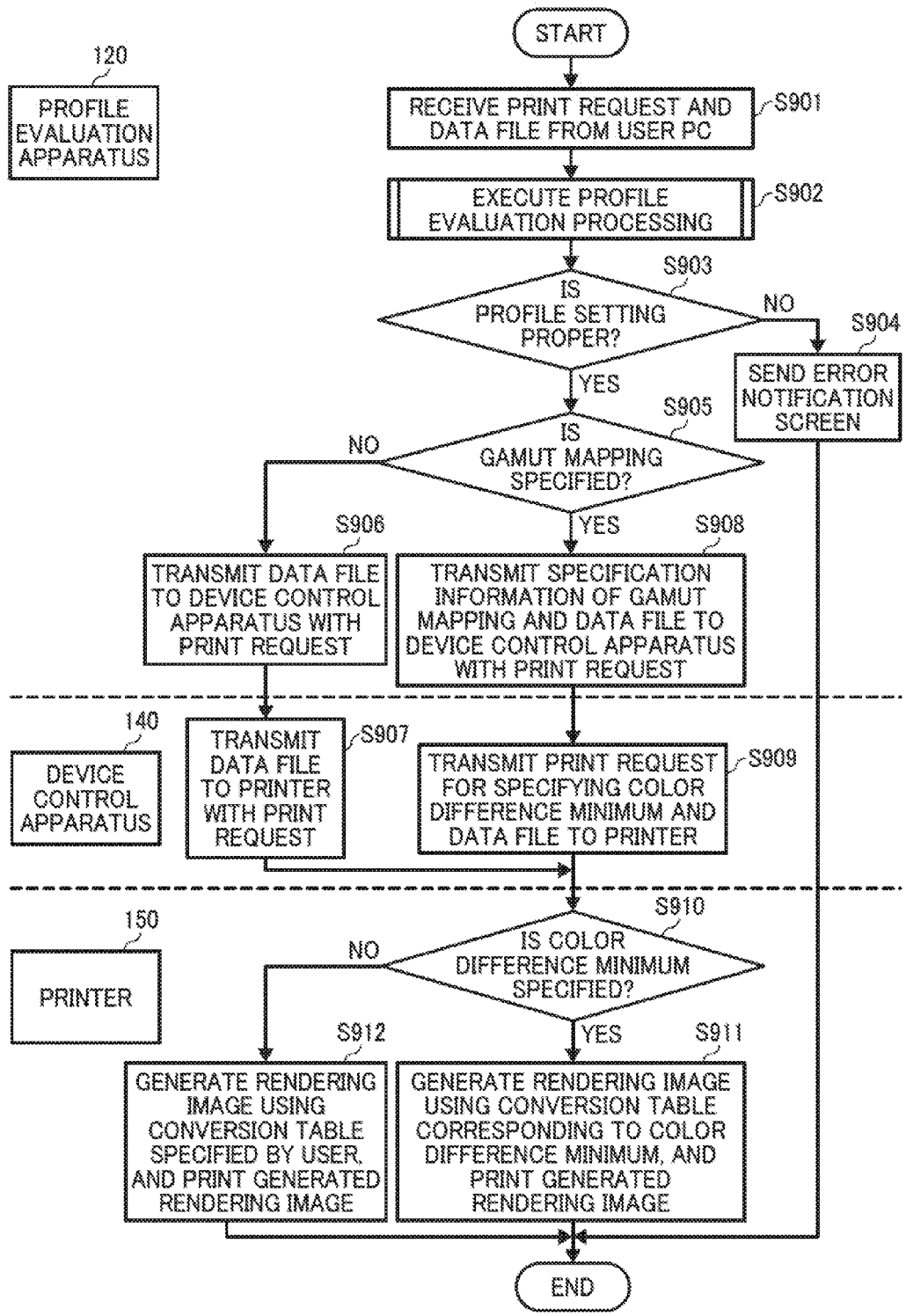
FIG. 9 is a data sequence diagram illustrating operation of processing a print request, performed by the print control system of FIG. 1, according to an embodiment of the present invention.

FIG. 9 is a data sequence diagram illustrating operation of processing an instruction for printing received from the user at the user PC 110, performed by the print control system 100, according to an embodiment of the present invention.

At S901, the user PC 110 transmits a data file to be printed, to the profile evaluation apparatus 120 with a print request, in response to an instruction from the user.

Figure 10:
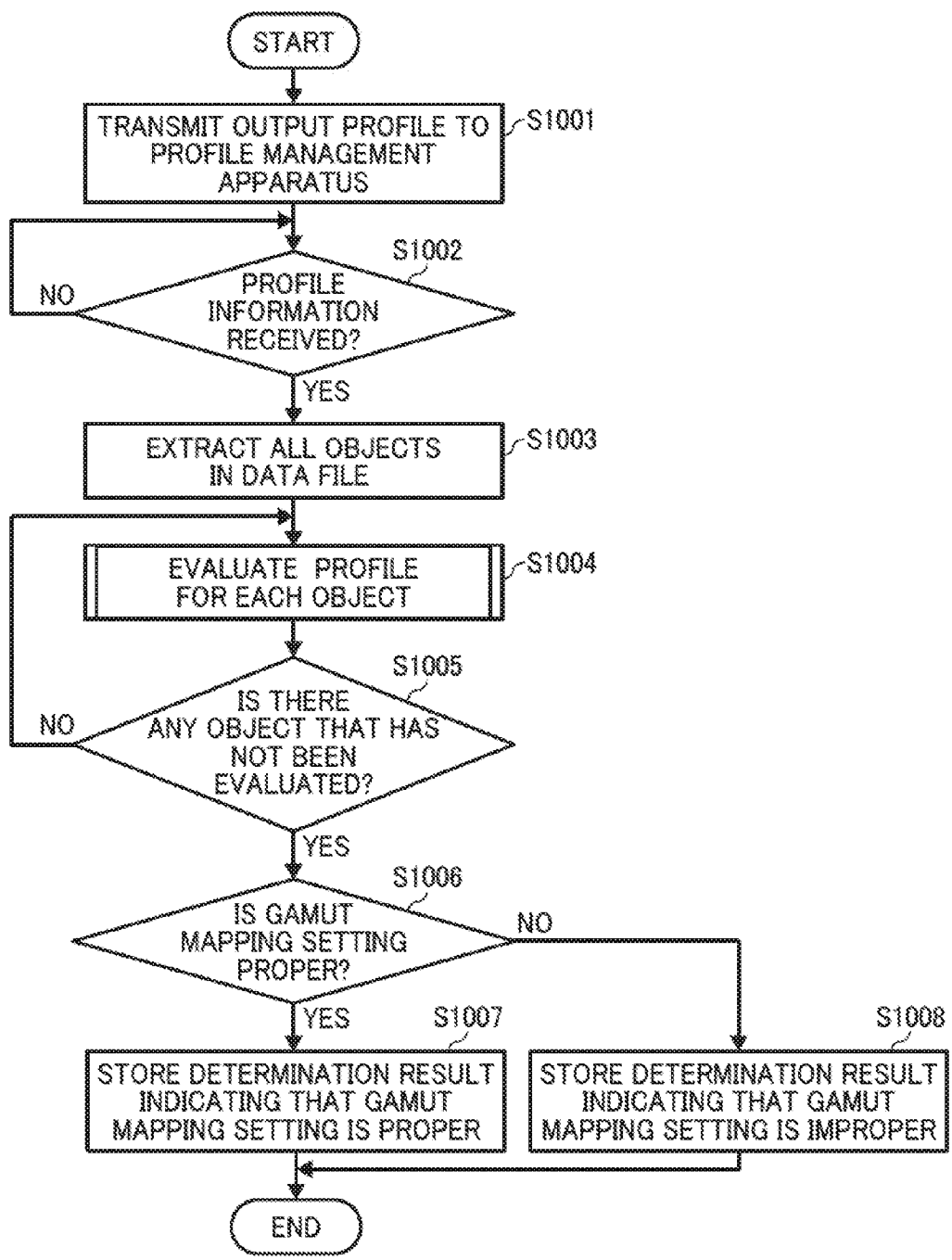
FIG. 10 is a flowchart illustrating operation of evaluating a profile of a data file, performed by the profile evaluation apparatus, according to an embodiment of the present invention.

At S902, the profile evaluation apparatus 120, which receives the print request, executes profile evaluation processing illustrated in FIG. 10 to evaluate the setting of the profile for each object, and stores the obtained evaluation result for each object in any desired memory of the profile evaluation apparatus 120, for example, in the form of a data file evaluation list.

At S903, the profile evaluation apparatus 120 determines whether the setting of the profile for each object is proper, based on the evaluation result of the setting of the profile that is stored in the data file evaluation list.

When the setting of the profile is determined to be improper ("NO" at S903), operation proceeds to S904. At S904, the printability determining unit 504 of the profile evaluation apparatus 120 transmits an error notification to the user PC 110. The display controller 401 of the user PC 110 displays an error notification screen indicating that the setting of the profile is improper, on the display 205 of the user PC 110, and operation ends.

On the other hand, when the profile evaluation apparatus 120 determines at S903 that the setting of the profile is proper ("YES" at S903), operation proceeds to S905. At S905, the printability determining unit 504 of the profile evaluation apparatus 120 determines whether a gamut mapping is to be applied to any object in the data file, by referring to gamut mapping information of all input profiles in the data file to be printed. If none of the input profiles indicates application of a gamut mapping ("NO" at S905), operation proceeds to S906.

At S906, the printability determining unit 504 transmits the data file to be printed, to the device control apparatus 140 together with a print request. At S907, the device control apparatus 140 transmits the data file to be printed, to an output destination printer together with a print request.

On the other hand, if the printability determining unit 504 determines at S905 that a gamut mapping is to be applied to any object in the data file ("YES" at S905), operation proceeds to S908. At S908, the profile evaluation apparatus 120 transmits, to the device control apparatus 140, information indicating that a gamut mapping is to be applied, and the data file to be printed, together with a print request.

At S909, the device control apparatus 140 transmits the data file to be printed that is received from the profile evaluation apparatus 120, to the output destination printer with a print request for printing the data file. The device control apparatus 140 generates the print request that requests application of the color difference minimum as rendering intent, so as to faithfully reproduce a color gamut of the output destination printer.

At S910, the print controller 803 of the printer 150*a* or 150*b* (printer 150) that has received the print request from the device control apparatus 140 determines whether the color difference minimum is specified in the received print request. If the color difference minimum is specified ("YES" at S910), operation proceeds to S911. At S911, the rendering image generator 804 of the printer 150 converts an object in the data file to be printed, using a conversion table corresponding to the color difference minimum, and generates a rendering image being raster data. The plotter controller 805 then controls the plotter 306 to print the generated rendering image, and operation ends. By using the conversion table corresponding to the color difference minimum in this manner, the reduction in color reproducibility can be prevented.

On the other hand, if the color difference minimum is not specified ("NO" at S910), operation proceeds to S912. At S912, the rendering image generator 804 of the printer 150 converts an object in the data file to be printed, using a conversion table that corresponds to setting of the user, which is obtained from the data file sent from the user PC 110, to generate a rendering image. For example, the conversion table may be selected from a conversion table corresponding to perceptual for smoothly reproducing gradation, a conversion table corresponding to saturation that enables vivid color reproduction, and a conversion table corresponding to the color difference minimum, according to the user setting that may be extracted from the data file. The plotter controller 805 then controls the plotter 306 to print the generated rendering image, and operation ends.

In the above-described embodiment, S902 of profile evaluation processing is performed in various ways. In one example, the profile evaluation apparatus 120 may determine whether the output destination apparatus to apply gamut mapping as specified in the input profile is inconsistent with the output destination apparatus to apply gamut mapping as specified in the output profile. In another example, the profile evaluation apparatus 120 may determine whether the output destination apparatus to apply gamut mapping as specified in the input profile differs among a plurality of objects in the data file. In another example, setting of gamut mapping differs among a plurality of objects in the data file.

For example, as illustrated in FIG. 1, it is assumed that the data file "I" includes a first object "A" (RGB image with an input profile having gamut mapping "ON"), a second object "B" (CMYK image with an input profile having gamut mapping "OFF"), and a third object "C" (RGB image with an input profile having gamut mapping "ON"). The entire data file is further embedded with an output profile "O" having gamut mapping "ON". The profile evaluation apparatus 120 may obtain the gamut mapping setting from header information of the input profile, and checks whether gamut mapping is to be applied for each object. In this case, since a setting of gamut mapping differs among a plurality of objects in the data file, the profile evaluation apparatus 120 determines that setting of profile is improper.

The following describes non-limiting examples of evaluation processing.

FIG. 10 is a flowchart illustrating operation of evaluating profile, which is performed at S902 of FIG. 9 by the profile evaluation apparatus 120, according to an embodiment of the present invention.

When the receiver 500 of the profile evaluation apparatus 120 receives a print request from the user PC 110, the profile evaluation apparatus 120 performs processing illustrated in FIG. 10. At S1001, the profile acquisition unit 501 extracts the output profile from the data file to be printed that is received from the user PC 110, and transmits the output profile to the profile management apparatus 130 together with a request for profile information of the output profile of the data file.

At S1002, the receiver 500 determines whether profile information of the output profile (i.e., color space information, color gamut information, output apparatus identification information, and gamut mapping information) has been received from the profile management apparatus 130. In the present embodiment, when the profile evaluation apparatus 120 transmits an output profile to the profile management apparatus 130, the profile management apparatus 130 obtains, from the memory, profile information stored in association with an output profile that matches the transmitted output profile, and transmits the obtained profile information to the profile evaluation apparatus 120. Examples of profile information of an output profile that is obtained from the memory include, but not limited to, color space information (CMYK, etc.), color gamut information (conversion table of Lab and CMYK), output apparatus identification information identifying one of the printers 150*a* and 150*b*, and gamut mapping information indicating whether to apply gamut mapping.

If profile information of the output profile has not been received from the profile management apparatus 130 ("NO" at S1002), the processing at S1002 is repeated. On the other hand, if profile information of the output profile has been received from the profile management apparatus 130 ("YES" at S1002), operation proceeds to S1003.

At S1003, the object extractor 502 extracts all objects included in the data file to be printed, to generate list information of the objects ("object list information"). For example, the object extractor 502 assigns identification ("object ID") to each of the extracted objects, and stores profile information for the extracted object that is extracted from the data file in association with the object ID.

At S1004, the profile evaluation unit 503 evaluates profile information for each object to obtain an evaluation result for each object, and stores the obtained evaluation result into an evaluation list of each object (hereinafter, referred to as "object evaluation list"). The processing for evaluating profile information may be performed, for example, as described below referring to FIG. 11 or FIG. 15.

At S1005, the profile evaluation unit 503 determines whether there is any object that has not been evaluated, by referring to the object list information. If there is an object that has not been evaluated ("NO" at S1005), operation returns to S1004 to perform S1004 for the unprocessed object. On the other hand, if there is no object that has not been evaluated ("YES" at S1005), operation proceeds to S1006.

At S1006, the profile evaluation unit 503 determines whether a gamut mapping setting is proper, by referring to the evaluation lists of all the objects generated at S1004. More specifically, the profile evaluation unit 503 determines whether an object for which gamut mapping execution is instructed, and an object for which gamut mapping execution is not instructed are mixedly included in the data file. If these objects are not mixedly included, the profile evaluation unit 503 determines that the gamut mapping setting is proper. On the other hand, if these objects are mixedly included, the profile evaluation unit 503 determines that the gamut mapping setting is improper.

If the gamut mapping setting is proper ("YES" at S1006), operation proceeds to S1007. At S1007, the profile evaluation unit 503 stores a determination result indicating that the gamut mapping setting is proper, into an evaluation list of each data file (hereinafter, referred to as "data file evaluation list").

On the other hand, if the gamut mapping setting is improper ("NO" at S1006), operation proceeds to S1008. At S1008, the profile evaluation unit 503 registers a determination result indicating that the gamut mapping setting is improper, into the data file evaluation list, and operation ends.

Figure 11:
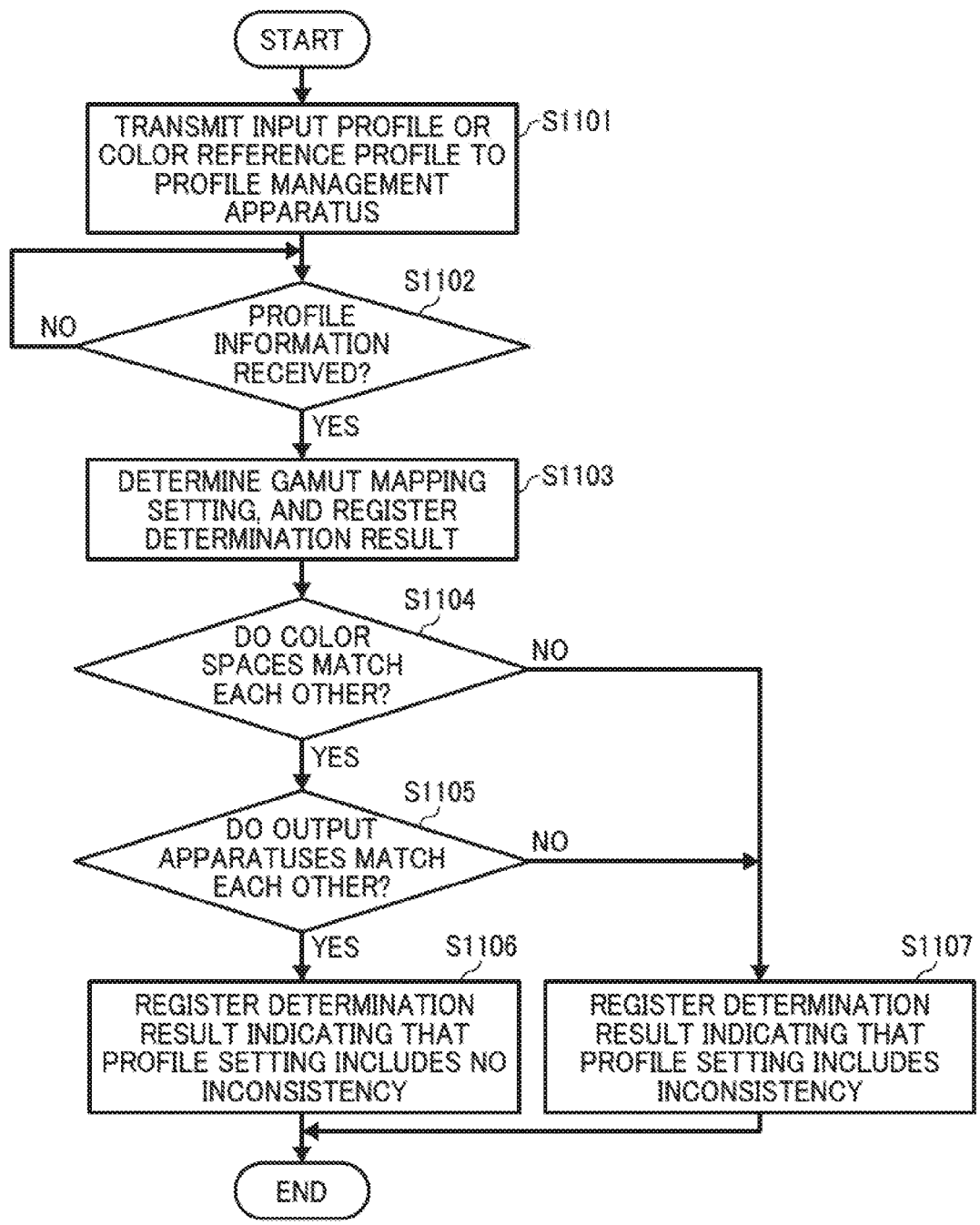
FIG. 11 is a flowchart illustrating operation of evaluating profile information, performed by the profile evaluation apparatus, according to an embodiment of the present invention.

FIG. 11 is a flowchart illustrating operation of evaluating profile information, performed by the profile evaluation apparatus 120 at S1004 of FIG. 10, according to an embodiment of the present invention. At S1101, the profile acquisition unit 501 obtains an input profile or a color reference profile of an object to be evaluated, which is extracted from the data file to be printed, and transmits the obtained profile to the profile management apparatus 130 with a request for profile information of the obtained profile. In the present embodiment, it is assumed that, aside from the output profile, at least one of the input profile of the input apparatus and the color reference profile of the input apparatus has been embedded to the data file to be printed, for each object.

At S1102, the receiver 500 of the profile evaluation apparatus 120 determines whether profile information of the transmitted profile has been received from the profile management apparatus 130. In the present embodiment, when the profile evaluation apparatus 120 transmits an input profile to the profile management apparatus 130 at S1101, the profile management apparatus 130 provides the profile evaluation apparatus 120 with profile information associated with the transmitted input profile (i.e., profile information including color space information (RGB, etc.) and color gamut information (sRGB, AdobeRGB, etc.)).

In another example, when the profile evaluation apparatus 120 transmits a color reference profile to the profile management apparatus 130, the profile management apparatus 130 provides the profile evaluation apparatus 120 with profile information associated with the transmitted color reference profile (i.e., profile information including color space information (RGB, etc.), color gamut information (conversion table of RGB and Lab), output apparatus identification information, and gamut mapping information).

If profile information has not been received from the profile management apparatus 130 ("NO" at S1102), the processing at S1102 is repeated. On the other hand, if profile information has been received from the profile management apparatus 130 ("YES" at S1102), operation proceeds to S1103.

At S1103, the profile evaluation unit 503 determines a gamut mapping setting of each object by referring to header information of the input profile or the color reference profile of an object to be evaluated that is included in the data file to be printed. The profile evaluation unit 503 then registers the obtained determination result into the object evaluation list. More specifically, the profile evaluation unit 503 registers, into the object evaluation list of each object, information indicating that the execution of gamut mapping is specified, when the gamut mapping setting specifies the execution of gamut mapping, or information indicating that the execution of gamut mapping is not specified, when the gamut mapping setting does not specify the execution of gamut mapping.

At S1104, the profile evaluation unit 503 determines whether a color space specified in the profile information of the input profile or the color reference profile that is associated with the object to be evaluated matches a color space indicated by profile information of an input profile or a color reference profile that has been received from the profile management apparatus 130. If these color spaces do not match each other ("NO" at S1105), operation proceeds to S1107. On the other hand, if these color spaces match each other ("YES" at S1105), operation proceeds to S1105.

At S1105, the profile evaluation unit 503 determines whether a printer specified in a color reference profile included in the data file to be printed matches a printer indicated by profile information of an output profile that has been received from the profile management apparatus 130 at S1002 of FIG. 10. The printer may be identified with the printer ID, which is an example of output apparatus identification information. If these printers match each other ("YES" at S1105), operation proceeds to S1106. On the other hand, if these printers do not match each other ("NO" at S1105), operation proceeds to S1107.

At S1106, the profile evaluation unit 503 registers a determination result indicating that the setting of the profile includes no inconsistency, into the object evaluation list of the object being evaluated. At S1107, the profile evaluation unit 503 registers a determination result indicating that the setting of the profile includes inconsistency, into the object evaluation list of the object being evaluated.

Figure 12:
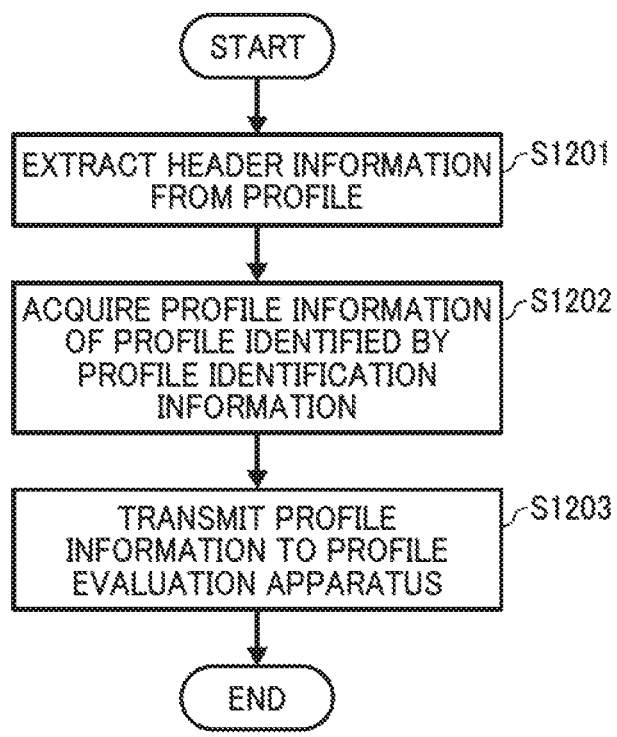
FIG. 12 is a flowchart illustrating operation of providing profile information, performed by the profile management apparatus, according to an embodiment of the present invention.

FIG. 12 is a flowchart illustrating operation of providing profile information in response to receiving a request for profile information from the profile evaluation apparatus 120, performed by the profile management apparatus 130, according to an embodiment of the present invention.

When the receiver 600 of the profile management apparatus 130 receives a request for profile information, the profile management apparatus 130 performs operation illustrated in FIG. 12. At S1201, the header information extractor 601 extracts header information as illustrated in FIG. 14, from an input profile, an output profile, or a color reference profile that has been received together with the request for profile information.

At S1202, the profile acquisition unit 602 extracts identification information of the profile (Profile_ID) from the header information to acquire profile information of a profile (input profile, output profile, or color reference profile) identified by the extracted identification information of the profile, from the memory (such as the HDD 203) of the profile management apparatus 130.

More specifically, when an output profile has been received from the profile evaluation apparatus 120, the profile acquisition unit 602 acquires, from the memory, profile information of an output profile that is associated with the identification information of the received output profile (i.e., profile information including color space information (CMYK, etc.), color gamut information (conversion table of Lab and CMYK), and output apparatus identification information).

When an input profile has been received from the profile evaluation apparatus 120, the profile acquisition unit 602 acquires, from the memory, profile information of an input profile that is associated with the identification information of the received input profile (i.e., profile information including color space information (RGB, etc.) and color gamut information (sRGB, AdobeRGB, etc.)).

When a color reference profile has been received from the profile evaluation apparatus 120, the profile acquisition unit 602 acquires profile information of a color reference profile that is associated with the identification information of the received color reference profile (i.e., profile information including color space information (RGB, etc.), color gamut information (conversion table of RGB and Lab), output apparatus identification information, and gamut mapping information).

At S1203, the transmitter 603 transmits the profile information that has been acquired from the memory at S1202, to the profile evaluation apparatus 120, and operation ends.

In obtaining profile information for transmission to the profile evaluation apparatus 120, the profile management apparatus 130 may further determine whether to update profile information stored in the memory, for example, as described below referring to FIG. 13.

Figure 13:
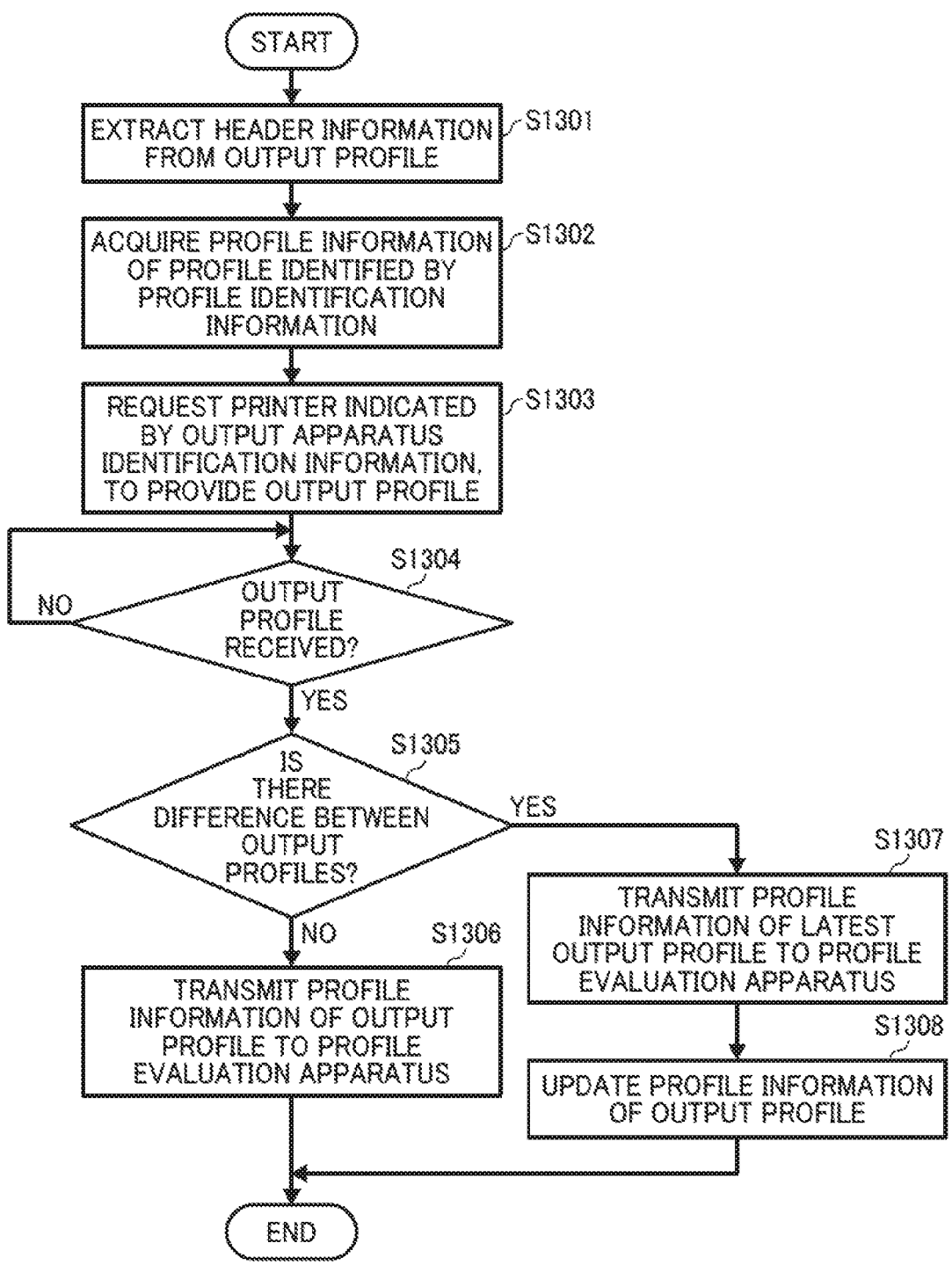
FIG. 13 is a flowchart illustrating operation of providing profile information, performed by the profile management apparatus, according to an embodiment of the present invention.

FIG. 13 is a flowchart illustrating operation of providing profile information in response to receiving a request for profile information from the profile evaluation apparatus 120, performed by the profile management apparatus 130, according to another embodiment of the present invention.

When the receiver 600 of the profile management apparatus 130 receives a request for an output profile, the profile management apparatus 130 may perform operation illustrated in FIG. 13 in alternative to operation of FIG. 12. At S1301, the header information extractor 601 extracts header information from the output profile that has been received together with the request for profile information of the output profile.

At S1302, the profile acquisition unit 602 extracts identification information of the output profile from the header information to acquire profile information of an output profile identified by the extracted identification information of the output profile, from the memory of the profile management apparatus 130. At S1303, the profile acquisition unit 602 requests a printer identified by output apparatus identification information included in the output profile, to provide an output profile and profile information of the output profile.

At S1304, the receiver 600 determines whether an output profile of a printer and profile information of the output profile have been received from the printer. If the output profile and profile information of the output profile have not been received from the printer ("NO" at S1304), S1304 is repeated. On the other hand, if the output profile and profile information of the output profile have been received from the printer ("YES" at S1304), operation proceeds to S1305.

At S1305, the update determination unit 604 determines whether there is a difference between the output profile received from the output apparatus and the output profile acquired at S1302. If there is no difference between the output profiles ("NO" at S1305), operation proceeds to S1306. At S1306, the transmitter 603 transmits profile information of the output profile acquired at S1302, to the profile evaluation apparatus 120.

On the other hand, if there is a difference between the output profiles ("YES" at S1305), operation proceeds to S1307. At S1307, the transmitter 603 transmits, to the profile evaluation apparatus 120, profile information of the latest output profile that has been received from the printer. At S1308, the update unit 605 stores the profile information of the latest output profile into the memory of the profile management apparatus 130 to update profile information of an output profile.

As described above referring to FIG. 13, the output profile of the printer can be updated at least at the time when the request for profile information is received.

The above-described operation of evaluating a profile of a data file may be performed in various other ways, for example, as described below referring to FIG. 15 to FIG. 18.

Figure 15:
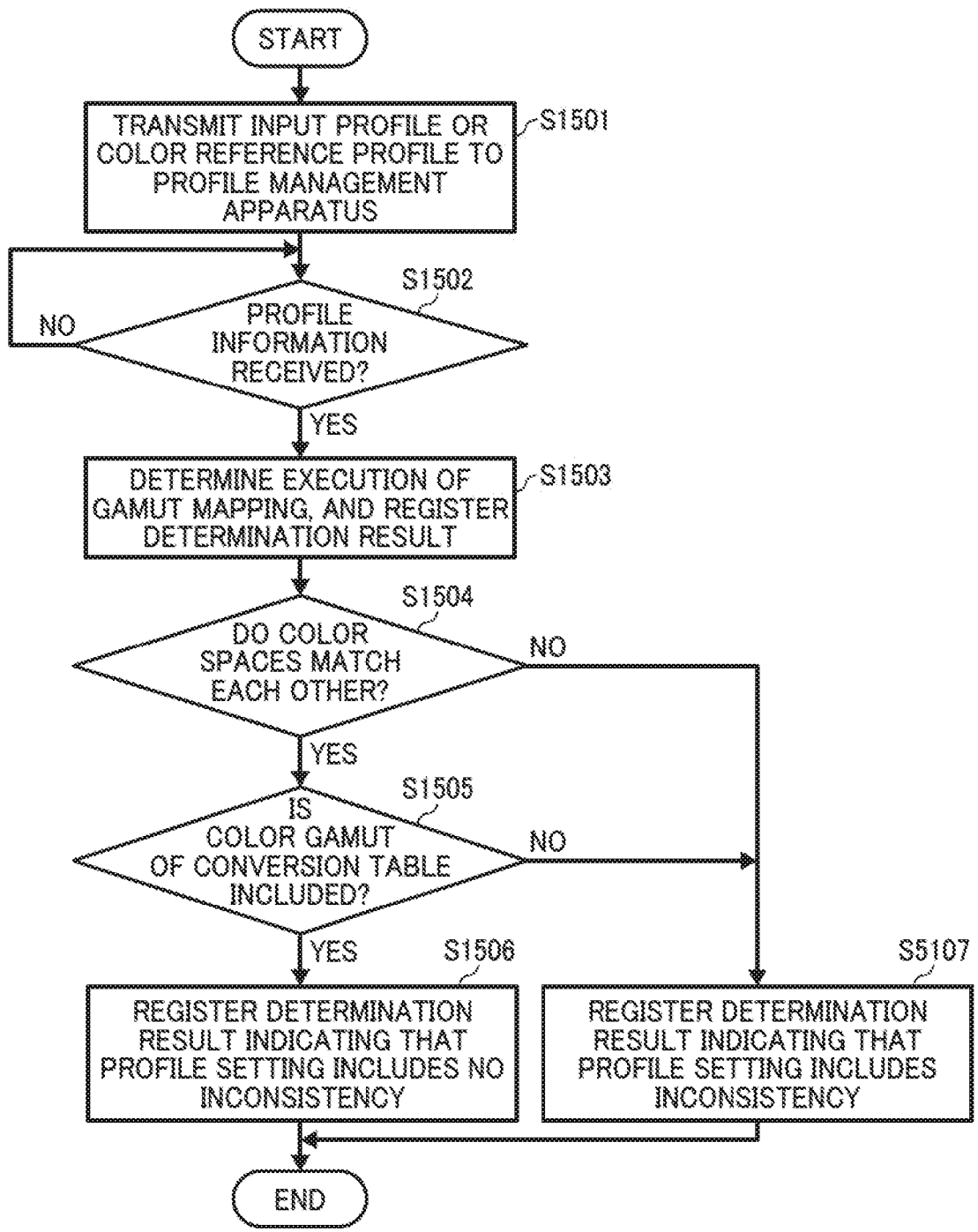
FIG. 15 is a flowchart illustrating operation of evaluating profile information, performed by the profile evaluation apparatus, according to an embodiment of the present invention.

FIG. 15 is a flowchart illustrating operation of evaluating profile information, performed by the profile evaluation apparatus 120 at S1004 of FIG. 10, according to another embodiment of the present invention. In this example, the profile evaluation apparatus 120 determines whether the output profile matches using a color gamut of conversion table, in alternative to using output apparatus identification information.

At S1501, the profile acquisition unit 501 of the profile evaluation apparatus 120 obtains an input profile or a color reference profile of an object to be evaluated, which is extracted from the data file to be printed, and transmits the obtained profile to the profile management apparatus 130 with a request for profile information.

At S1502, the receiver 500 of the profile evaluation apparatus 120 determines whether profile information of the transmitted profile has been received from the profile management apparatus 130. If profile information has not been received from the profile management apparatus 130 ("NO" at S1502), operation of S1502 is repeated. On the other hand, if profile information has been received from the profile management apparatus 130 ("YES" at S1502), operation proceeds to S1503.

At S1503, the profile evaluation unit 503 determines a gamut mapping setting of each object by referring to header information of the input profile or the color reference profile of the object to be evaluated that is included in the data file to be printed, and registers the obtained determination result into the object evaluation list of the object to be evaluated. More specifically, the profile evaluation unit 503 refers to gamut mapping information of profile information.

At S1504, the profile evaluation unit 503 determines whether a color space specified in the profile information (color space information) of the input profile or the color reference profile of the object to be evaluated matches a color space indicated by the profile information that has been received from the profile management apparatus 130. If these color spaces do not match each other ("NO" at S1504), operation proceeds to S1507. On the other hand, if these color spaces match each other ("YES" at S1504), operation proceeds to S1505.

At S1505, the profile evaluation unit 503 determines whether a color gamut of a conversion table of an output profile of the data file to be printed is included in a color gamut of a conversion table of a printer that is included in the profile information received from the profile management apparatus 130. More specifically, a color gamut of a conversion table can be obtained from color gamut information. If a color gamut of a conversion table of an output profile of the data file to be printed is included in a color gamut of a conversion table of a printer ("YES" at S1505), operation proceeds to S1506. If not ("NO" at S1505), operation proceeds to S1507.

At S1506, the profile evaluation unit 503 registers a determination result indicating that the setting of the profile includes no inconsistency, into an evaluation list, and operation ends At S1507, the profile evaluation unit 503 registers a determination result indicating that the setting of the profile includes inconsistency, into an evaluation list.

FIG. 16 is a flowchart illustrating operation of providing profile information in response to receiving a request for profile information from the profile evaluation apparatus 120, performed by the profile management apparatus 130, according to another embodiment of the present invention. In this example, the profile management apparatus 130 obtains a conversion table from the memory, which is associated with conversion table identification information of the data file that is received from the profile evaluation apparatus 120. That is, the data file transmitted from the user PC 110 includes conversion table identification information.

At S1601, the header information extractor 601 of the profile management apparatus 130 extracts conversion table identification information and header information from the profile that has been received together with the request for profile information. In the present embodiment, a conversion table such as an A-to-B table and a B-to-A table is used as conversion table identification information.

At S1602, the profile acquisition unit 602 extracts profile identification information from the header information, and acquires profile information of a profile identified by the extracted profile identification information, from the memory of the profile management apparatus 130.

At S1603, the conversion table acquisition unit 606 acquires a conversion table identified by the conversion table identification information, from the memory of the profile management apparatus 130. In the present embodiment, when an input profile or a color reference profile has been received from the profile evaluation apparatus 120, the conversion table acquisition unit 606 acquires a conversion table for converting RGB values into Lab values. On the other hand, when an output profile has been received from the profile evaluation apparatus 120, the conversion table acquisition unit 606 acquires a conversion table for converting CMYK values into Lab values.

At S1604, the transmitter 603 transmits the profile information and the conversion table that have been respectively acquired at S1602 and 1603, to the profile evaluation apparatus 120.

Referring now to FIGS. 17 and 18, the example case in which the profile information of the data file is evaluated using a profile determination policy, which is set by the user, is described according to an embodiment of the present invention. The user in this example may include an administrator of the profile evaluation apparatus 120, or the user operating the information processing apparatus 110. According to the profile determination policy, items subjected for evaluation may be modified, added, or deleted.

FIG. 17 is a flowchart illustrating operation of setting a profile determination policy, performed by the user PC 110, in response to a user instruction for displaying a profile determination policy registration screen.

At S1701, the display controller 401 of the user PC 110 displays a profile determination policy registration screen on the display 205 of the user PC 110. At S1702, the display controller 401 determines whether the user has specified a profile determination policy through the displayed registration screen, for example, using the input device 206.

If the user has not specified a profile determination policy using the displayed registration screen ("NO" at S1701), S1702 is repeated. On the other hand, if the user has specified a profile determination policy through the displayed registration screen ("YES" at S1701), operation proceeds to S1703.

At S1703, the transmitter 404 transmits the profile determination policy specified by the user, to the profile evaluation apparatus 120. In the present embodiment, when the profile evaluation apparatus 120 receives a profile determination policy from the user PC 110, the profile evaluation apparatus 120 stores the received profile determination policy into the memory of the profile evaluation apparatus 120.

FIG. 18 is a flowchart illustrating operation of evaluating profile information using a profile determination policy, performed by the profile evaluation apparatus 120, according to the embodiment of the present invention.

When the receiver 500 of the profile evaluation apparatus 120 receives a print request from the user PC 110, the profile evaluation apparatus 120 performs operation of FIG. 18. At S1801, the profile acquisition unit 501 extracts an output profile from the data file to be printed that has been provided by the user PC 110, and transmits the output profile to the profile management apparatus 130 with a request for profile information.

At S1802, the receiver 500 determines whether profile information of the output profile has been received from the profile management apparatus 130. If profile information of the output profile has not been received from the profile management apparatus 130 ("NO" at S1802), S1802 is repeated. On the other hand, if profile information of the output profile has been received from the profile management apparatus 130 ("YES" at S1802), operation proceeds to S1803.

At S1803, the object extractor 502 extracts objects to be evaluated, from the data file to be printed, based on a profile determination policy, and generates list information of the objects to be evaluated. At S1804, the profile evaluation unit 503 acquires a profile determination policy from the memory of the profile evaluation apparatus 120.

At S1805, the profile evaluation unit 503 evaluates, for each object to be evaluated, color space information (RGB/CMYK) and an input profile based on the profile determination policy, and stores the obtained evaluation result into an object evaluation list.

At S1806, the profile evaluation unit 503 determines whether there is any object that has not been evaluated, by referring to object list information. If there is an object that has not been evaluated ("YES" at S1806), operation returns to S1805. On the other hand, if there is no object that has not been evaluated ("NO" at S1806), operation proceeds to S1807.

At S1807, the profile evaluation unit 503 determines whether the objects mixedly include execution and nonexecution of gamut mapping, by referring to evaluation lists of all objects. If the objects do not mixedly include execution and nonexecution of gamut mapping ("NO" at S1807), operation proceeds to S1808. At S1808, the profile evaluation unit 503 stores a determination result indicating that there is no inconsistency in gamut mapping, into the data file evaluation list, and operation ends.

On the other hand, if the objects mixedly include execution and nonexecution of gamut mapping ("YES" at S1807), operation proceeds to S1809. At S1809, the profile evaluation unit 503 registers a determination result indicating that there is inconsistency in gamut mapping, into the data file evaluation list, and operation ends.

As described above, according to at least the above-described embodiments of the present invention, lowering of color reproducibility due to the error in a profile setting can be suppressed.

For example, in a case in which a plurality of objects is included in a data file to be printed, when gamut mapping for an object is specified in an input profile, and gamut mapping for the entire data file is specified in an output profile, a conventional image processing apparatus further executes, on an object having been subjected to gamut mapping based on the input profile, gamut mapping based on the output profile. There has been accordingly a problem of reduction in color reproducibility.

In addition, a user can specify an output apparatus in an input profile. Nevertheless, an output apparatus that is specified in an output profile and actually outputs a data file to be printed may be different from an output apparatus that is specified in an input profile. If printing is continued in such a case, a problem of reduction in color reproducibility occurs.

In the above-described embodiments, a profile evaluation apparatus evaluates a profile transmitted by an information processing apparatus that has requested printing. If the profile evaluation apparatus determines that the setting of the profile is improper, the profile evaluation apparatus instructs the information processing apparatus to notify the user that the setting of the profile is improper. This can prevent color reproducibility from being reduced due to the error in a profile setting.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An output control system comprising:
a receiver configured to receive a request for printing a data file having a plurality of objects from an information processing apparatus operated by a user, each object being embedded with a profile set by the user;
circuitry configured to determine whether a setting of the profiles in the data file is proper to generate a determination result; and
a transmitter configured to, when the determination result indicates that the setting of the profiles is improper, transmit a notification indicating that the setting of the profiles is improper, to the information processing apparatus for display to the user,
wherein the circuitry extracts at least one of an input profile and a color reference profile of an input apparatus that inputs the object from the profile of each one of the plurality of objects, and determines that the setting of the profiles in the data file is improper, when an output apparatus identified using the at least one of the input profile and the color reference profile differs than an output apparatus identified using an output profile of an output apparatus to print the data file.

2. The output control system according to claim 1, wherein the circuitry extracts gamut mapping information indicating whether to apply gamut mapping from the profile of each one of the plurality of objects, and determines that the setting of the profiles in the data file is improper when the extracted gamut mapping information has different values among the plurality of objects in the data file.

3. The output control system according to claim 1, wherein the circuitry extracts the input profile of the input apparatus that inputs the object from the profile of each one of the plurality of objects, and determines that the setting of the profiles in the data file is improper when a color space specified in the input profile and a color space specified in the output profile of the output apparatus to print the data file are different from each other for at least one object in the data file.

4. The output control system according to claim 3, wherein the circuitry further extracts the output profile from the data file to be printed.

5. The output control system according to claim 1, wherein the circuitry extracts gamut mapping information indicating whether to apply gamut mapping from the profile of each one of the plurality of objects, and when the gamut mapping information indicates to apply gamut mapping for at least one of the plurality of objects, the circuitry instructs an output apparatus to generate a rendering image of the data file using a conversion table that minimizes a color difference.

6. The output control system of claim 1, further comprising:
the information processing apparatus operated by the user, the information processing apparatus including a display that displays the notification indicating that the setting of the profiles is improper.

7. A method for controlling output of a data file, the method comprising:
receiving a request for printing a data file having a plurality of objects from an information processing apparatus operated by a user, each object being embedded with a profile set by the user;
determining whether a setting of the profiles in the data file is proper to generate a determination result;
transmitting, when the determination result indicates that the setting of the profiles is improper, a notification indicating that the setting of the profiles is improper, to the information processing apparatus for display to the user; and
extracting gamut mapping information indicating whether to apply gamut mapping from the profile of each one of the plurality of objects,
wherein the determining determines that the setting of the profiles in the data file is improper when the extracted gamut mapping information has different values among the plurality of objects in the data file.

8. The method according to claim 7, further comprising:
extracting an input profile of an input apparatus that inputs the object from the profile of each one of the plurality of objects,
wherein the determining determines that the setting of the profiles in the data file is improper when a color space specified in the input profile and a color space specified in an output profile of an output apparatus to print the data file are different from each other for at least one object in the data file.

9. The method according to claim 7, further comprising:
extracting at least one of an input profile and a color reference profile of an input apparatus that inputs the object from the profile of each one of the plurality of objects,
wherein the determining determines that the setting of the profiles in the data file is improper, when an output apparatus identified using the at least one of the input profile and the color reference profile differs than an output apparatus identified using an output profile of an output apparatus to print the data file.

10. The method according to claim 7, further comprising:
extracting gamut mapping information indicating whether to apply gamut mapping from the profile of each one of the plurality of objects; and
instructing an output apparatus to generate a rendering image of the data file using a conversion table that minimizes a color difference, when the gamut mapping information indicates to apply gamut mapping for at least one of the plurality of objects.

11. A non-transitory recording medium which, when executed by one or more processors, performs a method of controlling output of a data file comprising:
receiving a request for printing a data file having a plurality of objects from an information processing apparatus operated by a user, each object being embedded with a profile set by the user;
determining whether a setting of the profiles in the data file is proper to generate a determination result; and
transmitting, when the determination result indicates that the setting of the profiles is improper, a notification indicating that the setting of the profiles is improper, to the information processing apparatus for display to the user; and
extracting gamut mapping information indicating whether to apply gamut mapping from the profile of each one of the plurality of objects; and
instructing an output apparatus to generate a rendering image of the data file using a conversion table that minimizes a color difference, when the gamut mapping information indicates to apply gamut mapping for at least one of the plurality of objects.

12. The non-transitory recording medium according to claim 11,
wherein the determining determines that the setting of the profiles in the data file is improper when the extracted gamut mapping information has different values among the plurality of objects in the data file.

13. The non-transitory recording medium according to claim 11, wherein the method further comprises:
extracting an input profile of an input apparatus that inputs the object from the profile of each one of the plurality of objects,
wherein the determining determines that the setting of the profiles in the data file is improper when a color space specified in the input profile and a color space specified in an output profile of an output apparatus to print the data file are different from each other for at least one object in the data file.

14. The non-transitory recording medium according to claim 11, wherein the method further comprises:
extracting at least one of an input profile and a color reference profile of an input apparatus that inputs the object from the profile of each one of the plurality of objects,
wherein the determining determines that the setting of the profiles in the data file is improper, when an output apparatus identified using the at least one of the input profile and the color reference profile differs than an output apparatus identified using an output profile of an output apparatus to print the data file.

* * * * *